United States Patent
Delplace et al.

(10) Patent No.: US 6,272,419 B1
(45) Date of Patent: Aug. 7, 2001

(54) METHOD FOR CONTROLLING VEHICLE BEHAVIOR DURING CORNERING AND A BRAKING SYSTEM FOR IMPLEMENTATION THEREOF

(75) Inventors: Remy Delplace, Villeparisis; Xavier Marie Groult, Survilliers, both of (FR)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 09/317,345

(22) Filed: May 24, 1999

(30) Foreign Application Priority Data

Jun. 1, 1998 (GB) .................................................. 9811585

(51) Int. Cl.$^7$ ...................................................... B60T 8/24
(52) U.S. Cl. .............................................................. 701/72
(58) Field of Search .................................. 701/72, 78, 79, 701/83; 303/146, 147, 167, 186

(56) References Cited

U.S. PATENT DOCUMENTS

| | | | |
|---|---|---|---|
| 4,657,314 | * 4/1987 | Leiber ................................. | 303/100 |
| 4,852,009 | * 7/1989 | Jonner et al. ........................... | 701/72 |
| 5,124,921 | * 6/1992 | Jonner et al. ........................... | 701/70 |
| 5,281,012 | * 1/1994 | Binder et al. ....................... | 303/113.5 |
| 5,415,469 | * 5/1995 | Poggenburg et al. ............... | 303/186 |
| 5,632,535 | * 5/1997 | Luckevich et al. .................. | 303/186 |
| 5,646,849 | * 7/1997 | Walenty et al. ....................... | 701/70 |
| 5,975,650 | * 11/1999 | Meier et al. ......................... | 303/9.62 |
| 6,012,010 | * 1/2000 | Batistic et al. ......................... | 701/72 |

FOREIGN PATENT DOCUMENTS

WO 89/04782    6/1989  (WO) .

* cited by examiner

*Primary Examiner*—Michael J. Zanelli
(74) *Attorney, Agent, or Firm*—Robert M. Sigler

(57) ABSTRACT

This method for controlling the behaviour of an automotive vehicle during cornering consisting in measuring the rotational wheel speed of the front and rear wheels of the vehicle, establishing the wheel speed difference between the front and rear wheels and modifying the brake pressure applied to the rear wheel brakes of the vehicle according to a vehicle behaviour to be obtained, comprises the steps of elaborating a function of the absolute value of the wheel speed difference between the inner front wheel and the outer rear wheel, considering the cornering direction and using said function to determine the brake pressure variations to be applied to the rear wheel brakes.

11 Claims, 5 Drawing Sheets

METHOD FOR CONTROLLING VEHICLE BEHAVIOR DURING CORNERING AND A BRAKING SYSTEM FOR IMPLEMENTATION THEREOF

TECHNICAL FIELD

This invention relates to a method for controlling the behaviour of an automotive vehicle during cornering and to a braking system for implementing such a method.

More particularly, the present invention concerns a method wherein, using the wheel speed of the vehicle, the hydraulic brake pressure available to the wheel brakes is modified according to intended road-holding qualities.

BACKGROUND OF THE INVENTION

Some widely known types of vehicles are provided with an Anti-Lock Braking System (ABS), and with a Dynamic Rear Proportioning System (DRP) integrated within the ABS to perform the function of brake pressure proportioning between the front and rear brakes in order to provide the optimum brake force balance throughout the brake manoeuvre to enhance the performance of the braking system and to optimise the vehicle stability.

This type of braking system is quite efficient while the vehicle is moving in a substantial linear pathway, but is prone to be less accurate during cornering, due to the fact that the regulation of the braking balance is carried out using the front and rear wheel speed differential value which may not be high enough, during cornering, to generate a consistent data.

SUMMARY OF THE INVENTION

In view of the above problem, it is an object of the invention to provide a method for controlling the behaviour of a vehicle during cornering, capable, on the one hand, to enhance the braking performance, and on the other hand, to optimise the vehicle stability.

Another object of the invention is to provide a braking system carrying out the above method.

For this purpose, the present invention provide a method for controlling the behaviour of an automotive vehicle during cornering consisting in measuring the rotational wheel speed of the front and rear wheels of the vehicle, establishing the wheel speed difference between the front and rear wheels and modifying the brake pressure applied to the rear wheel brakes of the vehicle according to a vehicle behaviour to be obtained, comprising the steps of:

elaborating a function of the absolute value of the wheel speed difference between the inner front wheel and the outer rear wheel, considering the cornering direction, and using said function to determine the brake pressure variations to be applied to the rear wheel brakes.

Further, the invention provides a braking system intended to implement the above method, said system including Dynamic Rear Proportioning means and further comprises:

measuring means for measuring the inner front wheel speed and the outer rear wheel speed, considering the cornering direction, means for establishing the absolute value of the difference between the inner front wheel speed and the outer rear wheel speed, control means for controlling the brake pressure applied to the vehicle rear wheel brakes, and computing means for calculating a function of the absolute value of the difference between the inner front wheel speed and the outer rear wheel speed, said computing means being connected to said measuring means and said control means in order to modify the brake pressure applied to the rear wheel brakes using said function, according to the vehicle behaviour to be obtained.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
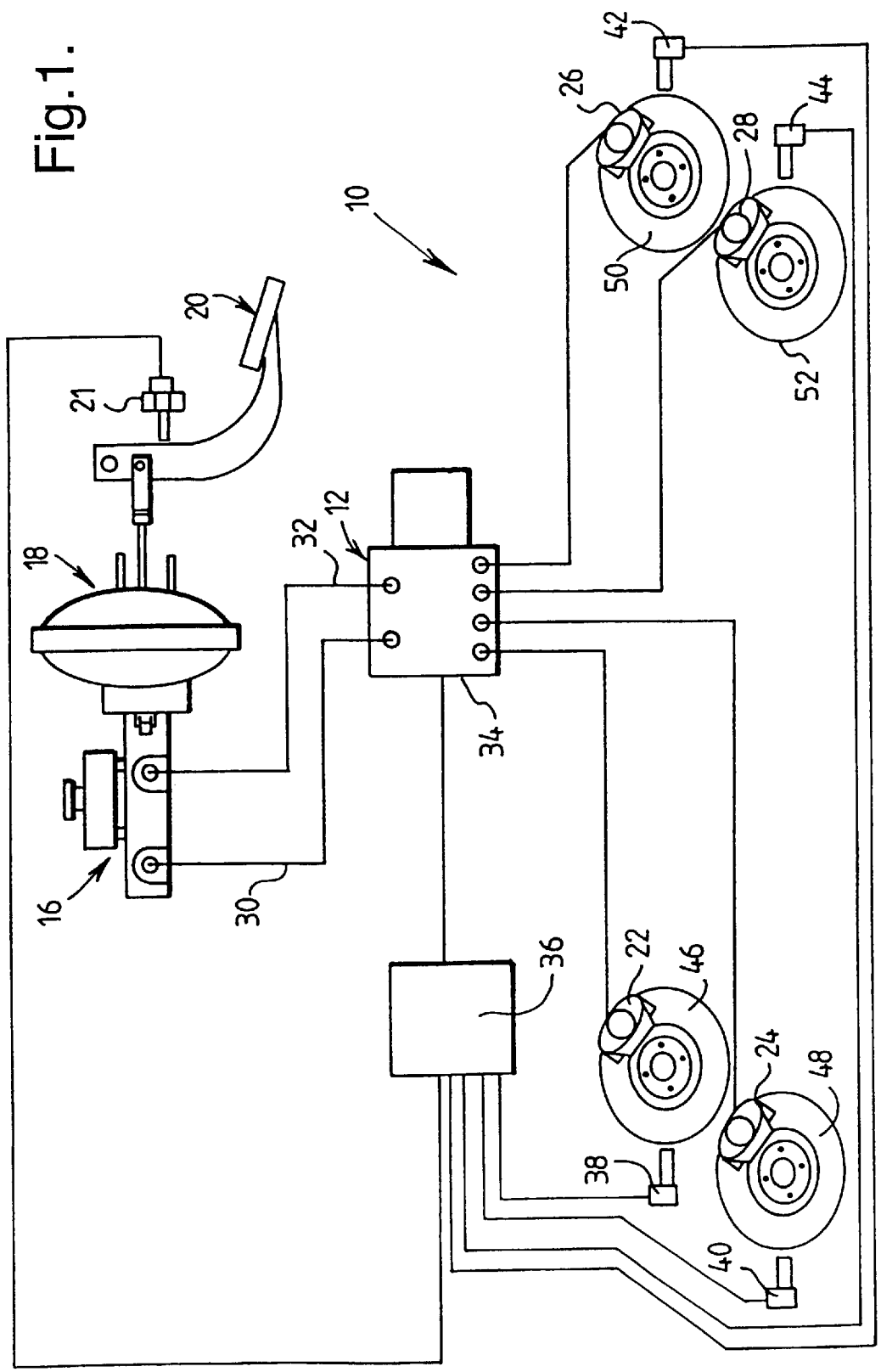
FIG. 1 is a general schematic diagram depicting a braking system according to the present invention.

The vehicle braking system illustrated on FIG. 1, denoted by the general reference numeral 10, is mainly constituted by an Anti-lock Braking system (ABS) 12, a Dynamic Rear Proportioning system (DRP) including DRP processing means and an associated memory (not shown), and an hydraulic system associated with conventional brake means.

The hydraulic system comprises a conventional master cylinder 16 associated with a known per-se booster 18.

The master cylinder 16 may be operated by the vehicle driver through a brake pedal 20 associated with a brake switch sensor 21 for applying fluid pressure, with power assist, to front wheel brakes 22 and 24 and rear wheel brakes 26 and 28.

Fluid pressure is applied to the front wheel brakes 22, 24 through a fluid line 30 and fluid pressure is applied to rear wheel brakes 26, 28 via a fluid line 32.

In a conventional manner, ABS modulator 34 of the ABS system 12 is included in the fluid lines 30 and 32 and controls, under control of an ABS controller 36, the fluid pressure applied to the front and rear brakes 22–28 in order to reduce the pressure to the brakes upon detection of wheel instability, for example when wheel deceleration exceeds a predetermined limit.

As indicated in FIG. 1, a set of wheel speed sensors 38, 40, 42 and 44, facing each wheel 46, 48, 50 and 52 respectively, provides the ABS controller 36 with data concerning the rotational speed of the vehicle wheels.

The system illustrated in FIG. 1 is completed by power supply means (not shown) associated with a switch for turning the ABS and DRP systems on and off.

It should be noted that the DRP system can be considered as a sub-system of the ABS system. Information shared by ABS and DRP as well as information specifically calculated for the DRP function is used for control of rear brakes 26, 28.

The DRP processing means (which is preferably incorporated in the controller 36) controls a variation of the fluid pressure partition between the rear and front brakes 26, 28, 22, 24 according to the intended road-holding qualities, by means of a DRP algorithm stored in the memory of the DRP system and implemented in the DRP processing means.

The control method of variation of the brake fluid pressure according to the vehicle behaviour during cornering to be obtained will now be described with reference to FIGS. 2 and 3.

Figure 2:
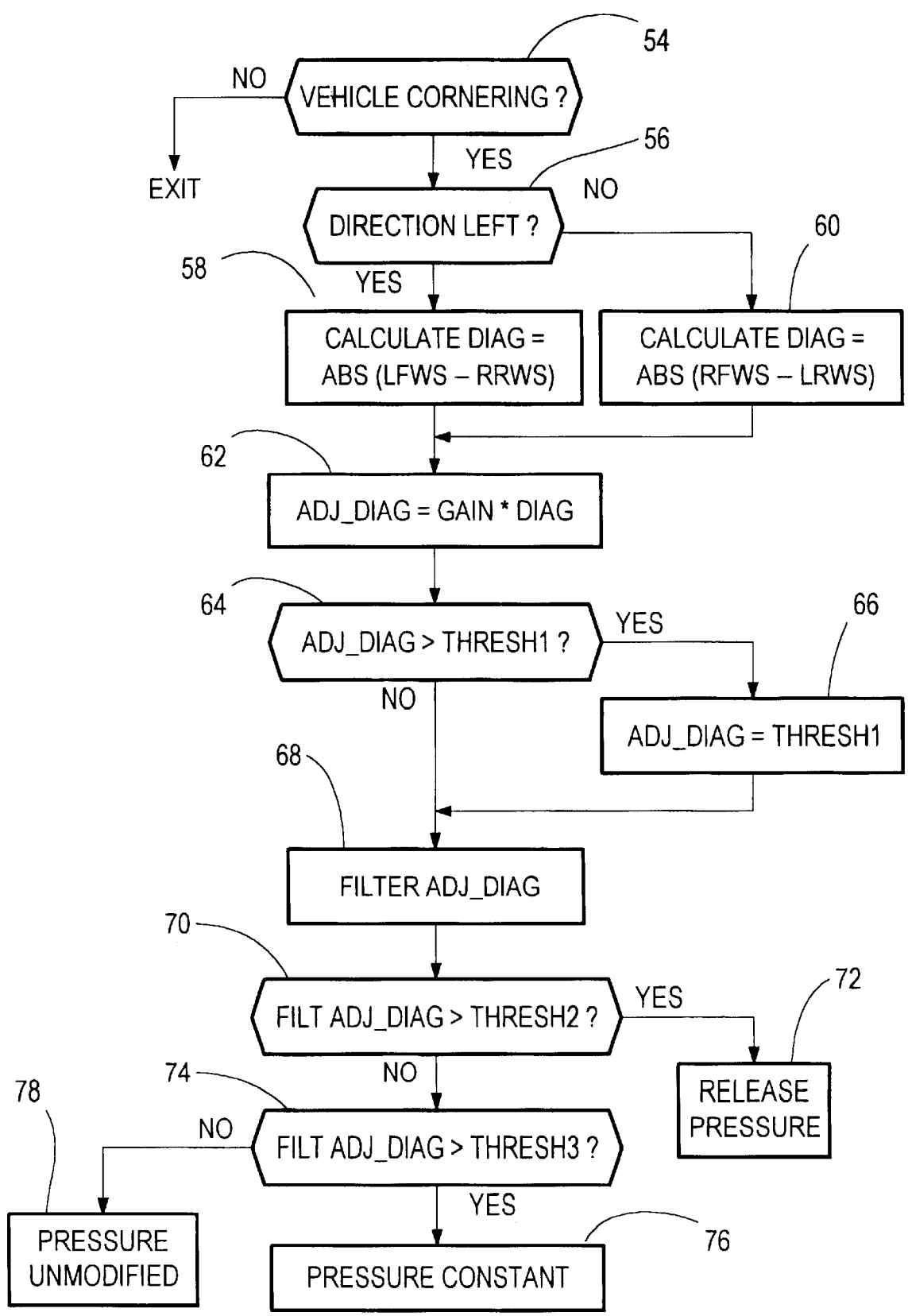
FIG. 2 is a flow chart of the control method routine implemented in the braking system shown in FIG. 1, for enhancing the vehicle stability.

Referring first to FIG. 2, in order to control the vehicle behaviour during cornering, the DRP processing means first detects at step 54 that the vehicle is actually cornering, using a conventional technique, based for example on wheel speed measurements.

During the following step 56, the DRP processing means detects the corner direction, namely as to whether it is a left or a right corner.

If the corner is a left one, DRP processing means calculates the absolute value of the difference between the left front wheel speed LFWS and the right rear wheel speed RRWS (step 58).

If the corner is a right one, DRP processing means calculates the absolute value of the difference between the right front wheel speed RFWS and the left rear wheel speed LRWS (step 60).

This calculated variable will be called hereinafter DIAG variable.

During the following step 62, the DRP processing means elaborates a function which will be called below ADJ_DIAG function and which will be used to determine the brake pressure variations to be applied to the rear brakes 26, 28.

For that purpose, DIAG variable is adjusted according to the intended road-holding qualities. Thus at step 62, DIAG variable is multiplied by a predetermined multiplier factor stored in the memory of the system and obtained by previous machine learning, said factor constituting a gain intended to compensate for the calculated variable value according to the vehicle behaviour to be obtained and the vehicle features, for example the length thereof.

The multiplier factor can modify oversteering or understeering behaviour of the vehicle.

Next, at step 64, the value of the function ADJ_DIAG obtained at the end of step 62 is compared with a threshold value THRESH 1, and if said function value is above this threshold value, the value of this latter is allocated to the value of ADJ_DIAG function (step 66).

The above computed function ADJ_DIAG is then input into a low-pass filter, for example a first order filter, in order to eliminate noise (step 68).

The filtered function value is then compared with a brake release threshold THRESH 2 (step 70). If said function value is above this second threshold value, it is decided at step 72 that the brake fluid pressure applied to the left and right rear brakes 26 and 28 is to be released.

If it is not the case, during the following step 74, the value of the filtered function ADJ_DIAG is compared with a brake holding threshold value THRESH 3 above which the pressure applied to the rear brakes is held constant.

Thus, if the filtered function value is above such a third threshold value, the pressure applied to the rear brakes 26, 28 is kept constant regardless of the pressure applied under the control of brake pedal 20 to the front brakes 22, 24 (step 76), and if it is not the case, i.e. if the filtered function value is less than the brake holding threshold value, the pressure applied to the rear brakes is kept unmodified, namely equal to the pressure in the fluid line 32 (step 78).

It is thus believed that the above mentioned routine is able, from the calculation of the absolute value of the difference between the rotational speed of the inner front wheel and the outer rear wheel, and according to desired road-holding qualities, to release, hold constant or let the rear braking pressure follow the pressure from the master cylinder 16.

The DRP processing means is also able to increase the brake pressure applied to the rear brakes 26, 28 when the vehicle is stable enough in order to enhance the braking efficiency, as explained below with reference to FIG. 3.

The routine implemented for that purpose begins with a first step 80 during which the DRP system checks whether the vehicle is actually cornering.

If it is the case, during the next step 82, the adjusted function value ADJ_DIAG obtained at the end of above mentioned steps 64 and 66, is compared with a fourth threshold value THRESH 4 which corresponds to a minimal stability condition above which the rear brake pressure increasing is allowed.

It is to be noted that during this step, rear brake pressure increasing is allowed only if this rear brake pressure has previously been held or released, that is, only if the corner is severe.

Next, at step 84, it is checked whether the vehicle is stable enough for increasing the rear brake pressure, by comparing the value of the function ADJ_DIAG with a fifth threshold value THRESH 5 which corresponds to a maximal stability condition above which the brake pressure increasing is not allowed.

Thus, if the adjusted value lies within the range delimited by the above fourth and fifth threshold values, it is then checked, during the next steps 86 and 88, whether the vehicle speed lies within a predetermined range, for example above 20 km/h (LOSPEED) and below 120 km/h (HISPEED), in order to avoid any pressure increasing if the vehicle speed is less than this lower speed value (step 86), which would render the rear brake pressure increasing of no interest and above the upper speed value (step 88), which may render the brake pressure increasing excessive.

Next, at step 90, if the vehicle speed lies within said predetermined range, the brake pressure applied to the rear brakes 26, 28 which has been previously held or released, is increased in order to enhance the braking efficiency.

Preferably, the brake pressure is increased in the form of pressure steps in order to be in a position to check, after each step, the vehicle stability.

After each step, the number of steps is compared with a step number threshold value THRESH 6 (step 92).

If the total number of steps previously applied reaches this threshold value, the rear brake pressure is then continuously increased up to a value equal to the pressure value in the fluid line 32 (step 94).

Figure 3:
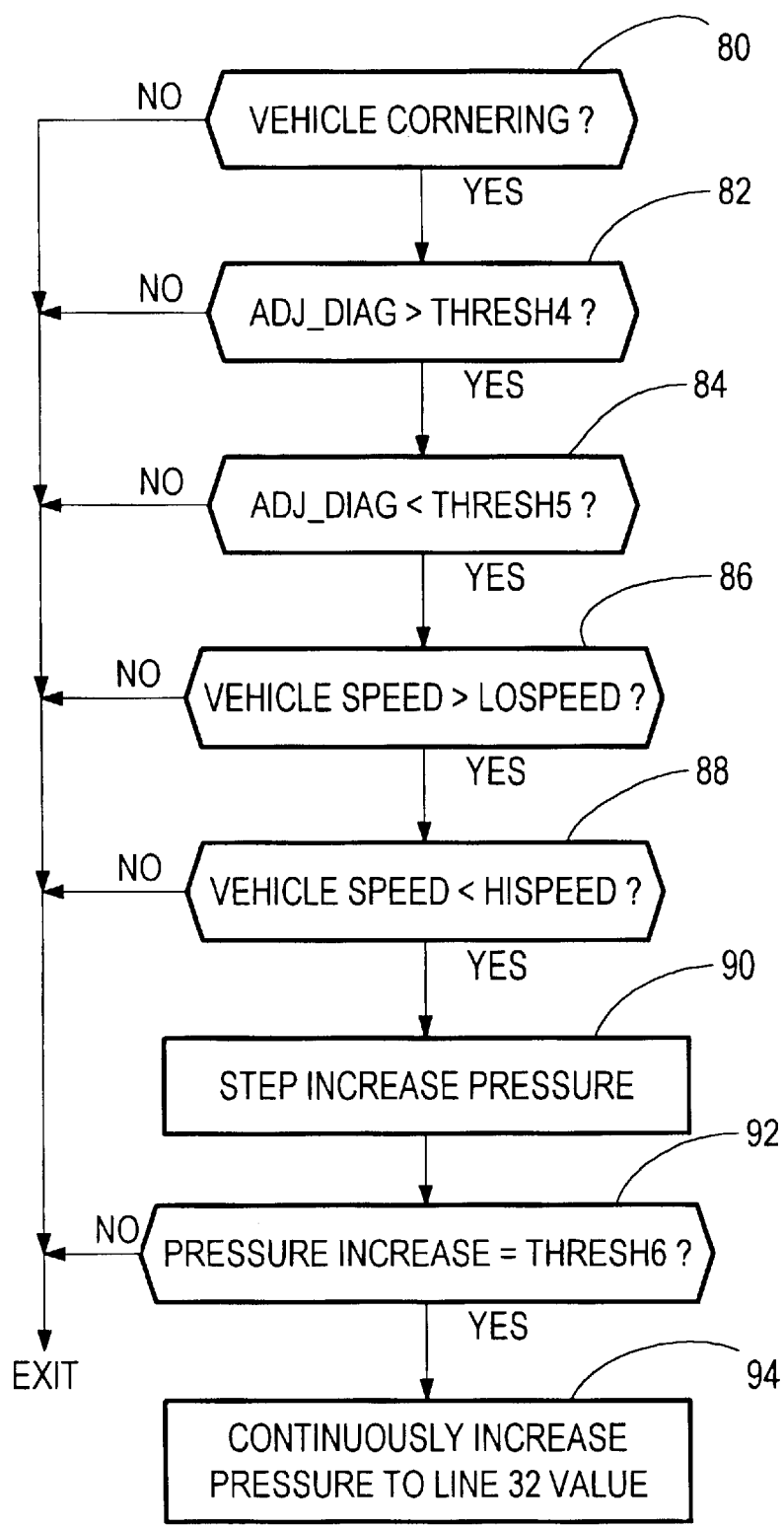
FIG. 3 is a flow chart of the control method routine implemented in the braking system shown in FIG. 1, for enhancing the performance of the braking system.

It should be noted that the above mentioned routines described in reference to FIGS. 2 and 3 permit, by means of the calculation of the absolute value of the difference between the inner front wheel speed and the outer rear wheel speed, which provide some information about the corner radius and the vehicle speed, to hold at a constant value, or release, or increase, or let the rear brake pressure follow the pressure applied by the master cylinder 16 of a vehicle while cornering, in order, on the one hand, to enhance the vehicle stability, and, on the other hand, if the vehicle is stable enough, to enhance the braking efficiency by reducing the braking distance.

The results obtained through the above-mentioned routines will now be given with reference to FIGS. 4a to 4h.

FIGS. 4a–4d depict the brake pressure, PRES_LF, PRES_RF, PRES_LR and PRES_RR as a function of time, applied to the left and right front and rear brakes, respectively, of a vehicle during cornering, at about 120 km/h.

Figure 4A:
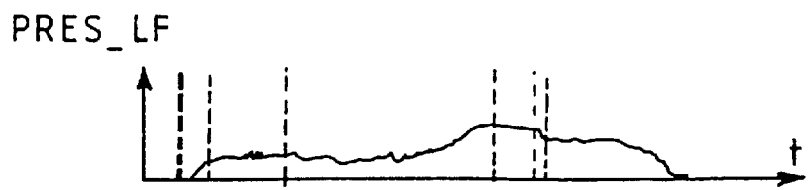
FIGS. 4a–4h show graphs illustrating the effects of the control method according to the present invention.
Figure 4B:
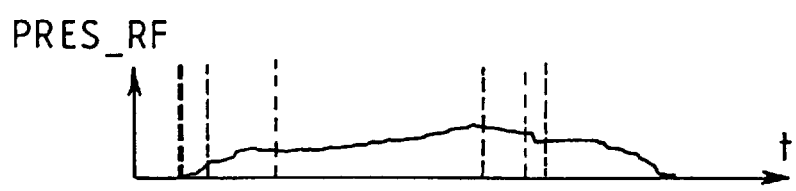
Figure 4C:
Figure 4D:
Figure 4E:
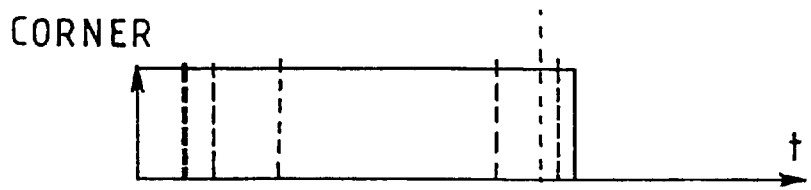

FIG. 4e depicts the variations of a signal CORNER during an aggressive manoeuvre delivered at the end of the above-mentioned step 56 during which the cornering is detected. This signal is high as long as the vehicle is cornering and is low when the vehicle is moving along a linear pathway.

Figure 4F:
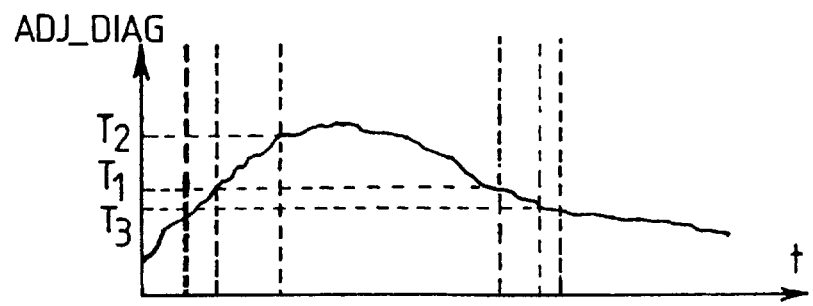
Figure 4G:
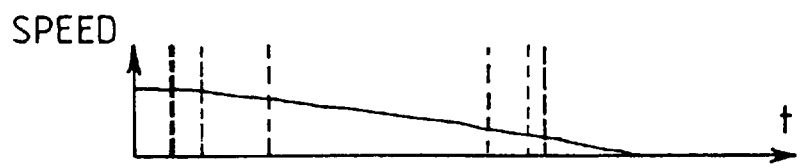

FIGS. 4f and 4g show the variation, as a function of time, of the filtered function ADJ_DIAG and of the speed vehicle SPEED, respectively.

The details of the function ADJ_DIAG shown at FIG. 4f have been magnified in order to improve clarity.

Figure 4H:
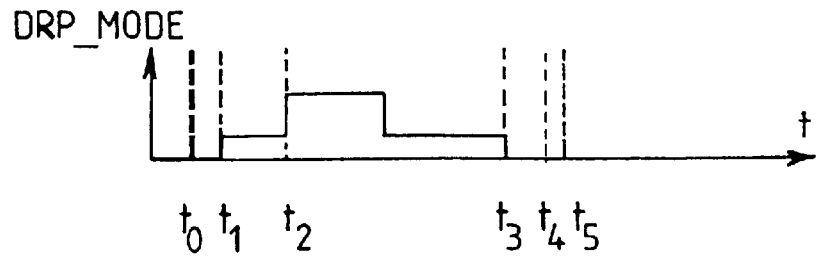

Finally, FIG. 4h illustrates the signal DRP_MODE corresponding to the running mode of the DRP processing means.

In FIG. 4h the signal DRP_MODE is high when, during step 70, it has been detected that the value of ADJ_DIAG is above the corresponding release threshold value and that the rear brake pressure is to be released.

This signal is low when it has been decided, at step 92, that the rear brake pressure is to be reapplied up to a value equal to that of the pressure in the fluid line 32.

In addition, this signal is set at a intermediate value when, at step 74, it has been decided that the brake pressure applied to the rear brakes 26, 28 is to be kept substantially constant.

At time t0, the vehicle driver actuates the brake pedal 20, which tends to increase the brake pressure applied to the front and rear brakes 22–28.

It can be seen on FIG. 4f that as soon as the adjusted function ADJ_DIAG is above the brake holding threshold value T1 (time t1), the DRP system is set in a hold mode, holding thus the right and left rear brake pressure substantially constant (FIGS. 4c and 4d).

Besides, FIG. 4f shows that as soon as the value of ADJ_DIAG is above the above-mentioned brake release threshold value T2 (time t2), the DRP system is set in a release mode in order to release the right and left rear brake pressure, rendering the signals shown on FIGS. 4c and 4d substantially equal to 0 until ADJ_DIAG drops below this second threshold value T2.

If the value of ADJ_DIAG drops below the brake holding threshold value (time t3), increasing of the rear brake pressure is allowed.

When the value of ADJ_DIAG drops below the above-mentioned fifth threshold value T3 (time t4), which indicates that the vehicle is in an acceptable stability condition, it can be seen on FIGS. 4c and 4d, that the right and left rear brake pressure is increased up to the value of the pressure applied to the front brakes, that is to says, the rear brake pressure controlled through the brake pedal 20 is kept unmodified.

In this case, as mentioned above, the brake pressure is first increased in the form of steps and, when the number of steps is above a predetermined value, the pressure is reapplied in a substantially continuous way (time t5) in order to shorten the braking distance.

What is claimed is:

1. A method for controlling the behaviour of an automotive vehicle during cornering comprising the steps:
measuring rotational wheel speeds of an inner front wheel and an outer rear wheel of the vehicle, relative to the direction of cornering,
establishing a wheel speed difference between the measured wheel speeds:
calculating the absolute value of the wheel speed difference between the measured wheel speeds, and
responsive to the calculated absolute value of the wheel speed difference between the measured wheel speeds, applying a braking pressure to rear wheel brakes of the vehicle to obtain a desired vehicle behaviour.

2. A method according to claim 1, wherein the absolute value of the wheel speed difference between the measured wheel speeds is multiplied by a multiplying factor predetermined according to the vehicle behaviour to be obtained to produce a compensated wheel speed difference.

3. A method according to claim 2, wherein the compensated wheel speed difference is limited to a first threshold value.

4. A method according to claim 3, wherein the braking pressure applied to the rear wheel brakes is released when the compensated wheel speed difference exceeds a second threshold value.

5. A method according to claim 4, wherein the braking pressure applied to the rear wheel brakes is kept substantially constant when the compensated wheel speed difference does not exceed the second threshold value but exceeds a third threshold value and wherein the braking pressure applied to the rear wheel brakes is set at a value substantially equal to that of an unmodified brake apply pressure when the compensated wheel speed difference does not exceed the third threshold value.

6. A method according to claim 5, wherein the braking pressure applied to the rear wheel brakes is compared with a fourth threshold value braking pressure applied to the rear wheel brakes and with a fifth threshold value defining a maximum stability condition and is allowed to increase when the compensated wheel speed difference lies within a range delimited by said fourth and fifth threshold values.

7. A method according to claim 6, wherein, after said comparing step with the fourth and fifth threshold values, the vehicle speed is compared with an upper speed threshold value and the braking pressure applied to the rear wheel brakes is permitted to increase only if the vehicle speed does not exceed the upper speed threshold value.

8. A method according to claim 6, wherein after said comparing step with the fourth and fifth threshold values, the vehicle speed is compared with a lower speed threshold value and the braking pressure applied to the rear wheel brakes is permitted to increase only if the vehicle speed exceeds the lower speed threshold value.

9. A method according to claim 6, wherein the rear brake pressure is increased in the form of pressure increasing pulses.

10. A method according to claim 9, wherein the number of pulses previously applied is compared with a predetermined threshold value above which the rear brake pressure is to be rendered equal to an unmodified brake apply pressure.

11. A braking system for a vehicle having front and rear wheels with brakes, the braking system comprising:
measuring means for measuring an inner front wheel speed and an outer rear wheel speed, considering the cornering direction,
means for establishing the absolute value of the difference between the inner front wheel speed and the outer rear wheel speed,
control means for controlling a brake pressure applied to the vehicle rear wheel brakes, and computing means for calculating a function from the absolute value of the difference between the inner front wheel speed and the outer rear wheel speed, said computing means being connected to said measuring means and said control means in order to modify the brake pressure applied to the rear wheel brakes using said variable, according to vehicle behaviour to be obtained.

* * * * *